United States Patent
Kojo et al.

(10) Patent No.: US 9,541,409 B2
(45) Date of Patent: *Jan. 10, 2017

(54) MARKER AIDED AUTONOMOUS VEHICLE LOCALIZATION

(71) Applicant: Nissan North America, Inc., Franklin, TN (US)

(72) Inventors: Naoki Kojo, Sunnyvale, CA (US); Mauro Della Penna, San Francisco, CA (US)

(73) Assignee: Nissan North America, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,008

(22) Filed: Dec. 18, 2014

(65) Prior Publication Data

US 2016/0178382 A1 Jun. 23, 2016

(51) Int. Cl.
G01C 21/34 (2006.01)
G05D 1/02 (2006.01)
G01C 21/20 (2006.01)

(52) U.S. Cl.
CPC ............ *G01C 21/34* (2013.01); *G01C 21/20* (2013.01); *G05D 1/0255* (2013.01); *G05D 1/0272* (2013.01); *G05D 1/0278* (2013.01)

(58) Field of Classification Search
CPC ... G05D 1/0272; G05D 1/0255; G05D 1/0278
USPC .......................................................... 701/25
See application file for complete search history.

(56) References Cited

U.S. PATENT DOCUMENTS

| 4,656,950 A | 4/1987 | Rhoton |
| 5,910,782 A * | 6/1999 | Schmitt .................... G08G 1/14 340/539.1 |
| 6,308,133 B1 | 10/2001 | Loffert et al. |
| 6,438,472 B1 | 8/2002 | Tano et al. |

(Continued)

FOREIGN PATENT DOCUMENTS

| EP | 2568310 A2 | 3/2013 |
| JP | 2013-182551 A | 9/2013 |
| WO | 2013-169182 A1 | 11/2013 |

*Primary Examiner* — Jerrah Edwards
*Assistant Examiner* — Majdi Alsomiri
(74) *Attorney, Agent, or Firm* — Young Basile Hanlon & MacFarlane, P.C.

(57) ABSTRACT

A method and apparatus for marker aided autonomous vehicle localization are disclosed. Marker aided autonomous vehicle localization may include an autonomous vehicle identifying transportation network information, identifying an origin, identifying a destination, generating a plurality of candidate routes from the origin to the destination based on the transportation network information, wherein each route from the plurality of routes indicates a distinct combination of road segments and lanes, generating an action cost probability distribution for each action in each candidate route, generating a route cost probability distribution based at least in part on the action cost probability distribution, identify an optimal route from the plurality of candidate routes based at least in part on the route cost probability distribution, and operate the autonomous vehicle to travel from the origin to the destination using the optimal route.

19 Claims, 6 Drawing Sheets

(56) References Cited

U.S. PATENT DOCUMENTS

| | | | |
|---|---|---|---|
| 6,640,188 B2 * | 10/2003 | Hashida | G01C 21/28 340/990 |
| 7,516,010 B1 | 4/2009 | Kaplan et al. | |
| 7,783,421 B2 | 8/2010 | Arai et al. | |
| 8,024,112 B2 | 9/2011 | Krumm et al. | |
| 8,452,771 B2 | 5/2013 | Kurciska et al. | |
| 8,566,029 B1 | 10/2013 | Lopatenko et al. | |
| 8,606,492 B1 | 12/2013 | Botnen | |
| 8,634,980 B1 | 1/2014 | Urmson et al. | |
| 8,655,588 B2 | 2/2014 | Wong et al. | |
| 8,694,232 B2 | 4/2014 | Kono et al. | |
| 8,768,539 B1 | 7/2014 | Clement et al. | |
| 8,896,685 B2 | 11/2014 | Ihara et al. | |
| 9,058,703 B2 | 6/2015 | Ricci | |
| 9,151,628 B1 | 10/2015 | Saito et al. | |
| 9,418,491 B2 | 8/2016 | Phillips | |
| 2005/0071082 A1 * | 3/2005 | Ohmura | G01C 21/365 701/431 |
| 2006/0184013 A1 | 8/2006 | Emanuel et al. | |
| 2008/0109127 A1 | 5/2008 | Ozaki | |
| 2009/0030885 A1 | 1/2009 | DePasquale et al. | |
| 2009/0125174 A1 | 5/2009 | Delean | |
| 2009/0174540 A1 | 7/2009 | Smith | |
| 2010/0109445 A1 | 5/2010 | Kurs et al. | |
| 2010/0256836 A1 | 10/2010 | Mudalige | |
| 2010/0256908 A1 | 10/2010 | Shimshoni et al. | |
| 2011/0106429 A1 | 5/2011 | Poppen et al. | |
| 2012/0089326 A1 | 4/2012 | Bouve | |
| 2012/0256588 A1 | 10/2012 | Hayashi et al. | |
| 2012/0271778 A1 | 10/2012 | Atkins et al. | |
| 2012/0303254 A1 | 11/2012 | Kirsch et al. | |
| 2013/0060461 A1 | 3/2013 | Wong et al. | |
| 2013/0073112 A1 | 3/2013 | Phelan et al. | |
| 2013/0211699 A1 | 8/2013 | Scharmann et al. | |
| 2013/0211705 A1 | 8/2013 | Geelen et al. | |
| 2013/0231824 A1 | 9/2013 | Wilson et al. | |
| 2013/0344856 A1 | 12/2013 | Silver et al. | |
| 2014/0036076 A1 | 2/2014 | Nerayoff et al. | |
| 2014/0058634 A1 | 2/2014 | Wong et al. | |
| 2014/0113619 A1 | 4/2014 | Tibbitts et al. | |
| 2014/0180727 A1 | 6/2014 | Freiberger et al. | |
| 2014/0236719 A1 | 8/2014 | Szostak et al. | |
| 2014/0285361 A1 | 9/2014 | Tippelhofer et al. | |
| 2014/0320318 A1 | 10/2014 | Victor et al. | |
| 2014/0350853 A1 | 11/2014 | Proux | |
| 2015/0039391 A1 | 2/2015 | Hershkovitz et al. | |
| 2015/0106010 A1 | 4/2015 | Martin et al. | |
| 2015/0134185 A1 | 5/2015 | Lee | |
| 2015/0141043 A1 | 5/2015 | Abramson et al. | |
| 2015/0237662 A1 | 8/2015 | Fischer | |
| 2015/0248131 A1 | 9/2015 | Fairfield et al. | |
| 2015/0248689 A1 | 9/2015 | Paul et al. | |
| 2015/0319093 A1 | 11/2015 | Stolfus | |
| 2015/0346718 A1 | 12/2015 | Stenneth | |
| 2015/0377635 A1 | 12/2015 | Beaurepaire et al. | |
| 2016/0003636 A1 | 1/2016 | Ng-Thow-Hing et al. | |
| 2016/0047660 A1 | 2/2016 | Fausten | |
| 2016/0071333 A1 | 3/2016 | Haidar et al. | |
| 2016/0125673 A1 | 5/2016 | Bromham et al. | |
| 2016/0247095 A1 | 8/2016 | Scicluna et al. | |
| 2016/0253707 A1 | 9/2016 | Momin et al. | |

\* cited by examiner

US 9,541,409 B2

MARKER AIDED AUTONOMOUS VEHICLE LOCALIZATION

TECHNICAL FIELD

This disclosure relates to autonomous vehicle navigation and localization.

BACKGROUND

An autonomous vehicle may be controlled autonomously, without direct human intervention, to traverse a route of travel from an origin to a destination. An autonomous vehicle may include a control system that may generate and maintain the route of travel and may control the autonomous vehicle to traverse the route of travel. Accordingly, a method and apparatus for marker aided autonomous vehicle localization may be advantageous.

SUMMARY

Disclosed herein are aspects, features, elements, implementations, and embodiments of marker aided autonomous vehicle localization.

An aspect of the disclosed embodiments is an autonomous vehicle for marker aided autonomous vehicle localization. The autonomous vehicle may include a processor configured to execute instructions stored on a non-transitory computer readable medium to identify transportation network information representing a vehicle transportation network, and identify a route from an origin to a destination in the vehicle transportation network using the transportation network information. The autonomous vehicle may include a trajectory controller configured to operate the autonomous vehicle to travel from the origin to the destination using the route. The processor may be configured to execute instructions stored on a non-transitory computer readable medium to detect an uncoded localization marker in the vehicle transportation network, determine localization marker information indicating a location of the uncoded localization marker in the vehicle transportation network based on the transportation network information and an identified location of the autonomous vehicle in the vehicle transportation network, generate first localization information indicating an orientation and a position of the autonomous vehicle relative to the uncoded localization marker in response to detecting the uncoded localization marker, and generate second localization information indicating a current location of the autonomous vehicle in the vehicle transportation network based on the first localization information and the localization marker information. The trajectory controller may be configured to operate the autonomous vehicle to travel from the current location to the destination in response to generating the second localization information.

Another aspect of the disclosed embodiments is an autonomous vehicle for marker aided autonomous vehicle localization. The autonomous vehicle may include a processor configured to execute instructions stored on a non-transitory computer readable medium to identify transportation network information representing a vehicle transportation network, the vehicle transportation network including a partially navigable portion, the partially navigable portion including a plurality of sparsely located uncoded localization markers, wherein each uncoded localization marker from the plurality of sparsely located uncoded localization markers is an instance of an invariant localization marker design, the transportation network information including localization marker information for each respective uncoded localization marker from the plurality of sparsely located uncoded localization markers, wherein the location information indicates a respective location of the respective uncoded localization marker in the vehicle transportation network. The processor may be configured to execute instructions stored on a non-transitory computer readable medium to identify a route from an origin to a destination in the vehicle transportation network using the transportation network information, wherein the route includes at least a part of the partially navigable portion of the vehicle transportation network. The autonomous vehicle may include a trajectory controller configured to operate the autonomous vehicle to travel from the origin to the destination using the route. The processor may be configured to execute instructions stored on a non-transitory computer readable medium to detect a first uncoded localization marker from the plurality of sparsely located uncoded localization markers in the vehicle transportation network, generate first localization information indicating an orientation and a position of the autonomous vehicle relative to the first uncoded localization marker in response to detecting the first uncoded localization marker, and generate second localization information indicating a current location of the autonomous vehicle in the vehicle transportation network based on the first localization information and localization marker information corresponding to the first uncoded localization marker, the localization marker information indicating a location of the uncoded localization marker in the vehicle transportation network. The trajectory controller may be configured to operate the autonomous vehicle to travel from the current location to the destination in response to generating the second localization information.

Another aspect of the disclosed embodiments is an autonomous vehicle for marker aided autonomous vehicle localization. The autonomous vehicle may include a processor configured to execute instructions stored on a non-transitory computer readable medium to identify transportation network information representing a vehicle transportation network, the vehicle transportation network including a partially navigable portion, the partially navigable portion including a plurality of sparsely located uncoded localization markers, wherein each uncoded localization marker from the plurality of sparsely located uncoded localization markers is an instance of an invariant localization marker design, the transportation network information including localization marker information for each respective uncoded localization marker from the plurality of sparsely located uncoded localization markers, wherein the location information indicates a respective location of the respective uncoded localization marker in the vehicle transportation network. The processor may be configured to execute instructions stored on a non-transitory computer readable medium to identify a route from an origin to a destination in the vehicle transportation network using the transportation network information, wherein the route includes at least a part of the partially navigable portion of the vehicle transportation network. The autonomous vehicle may include a trajectory controller configured to operate the autonomous vehicle to travel from the origin to the destination using the route. The processor may be configured to execute instructions stored on a non-transitory computer readable medium to generate first localization information indicating an estimated location of the autonomous vehicle within the partially navigable portion of the vehicle transportation network using odometry, detect a first uncoded localization marker from the plurality of sparsely located uncoded localization markers, generate second localization information indicating an orientation and a position of the autonomous vehicle relative to the first uncoded localization marker in response to detecting the first uncoded localization marker, determine localization marker information corresponding to the first uncoded localization marker, wherein determining the localization marker information includes identifying the first uncoded localization marker from the plurality of sparsely located uncoded localization markers based on the first localization information, and generate third localization information identifying a current location of the autonomous vehicle in the vehicle transportation network based on the second localization information and the localization marker information. The trajectory controller may be configured to operate the autonomous vehicle to travel from the current location to the destination in response to generating the third localization information.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which.

DETAILED DESCRIPTION

Figure 1:
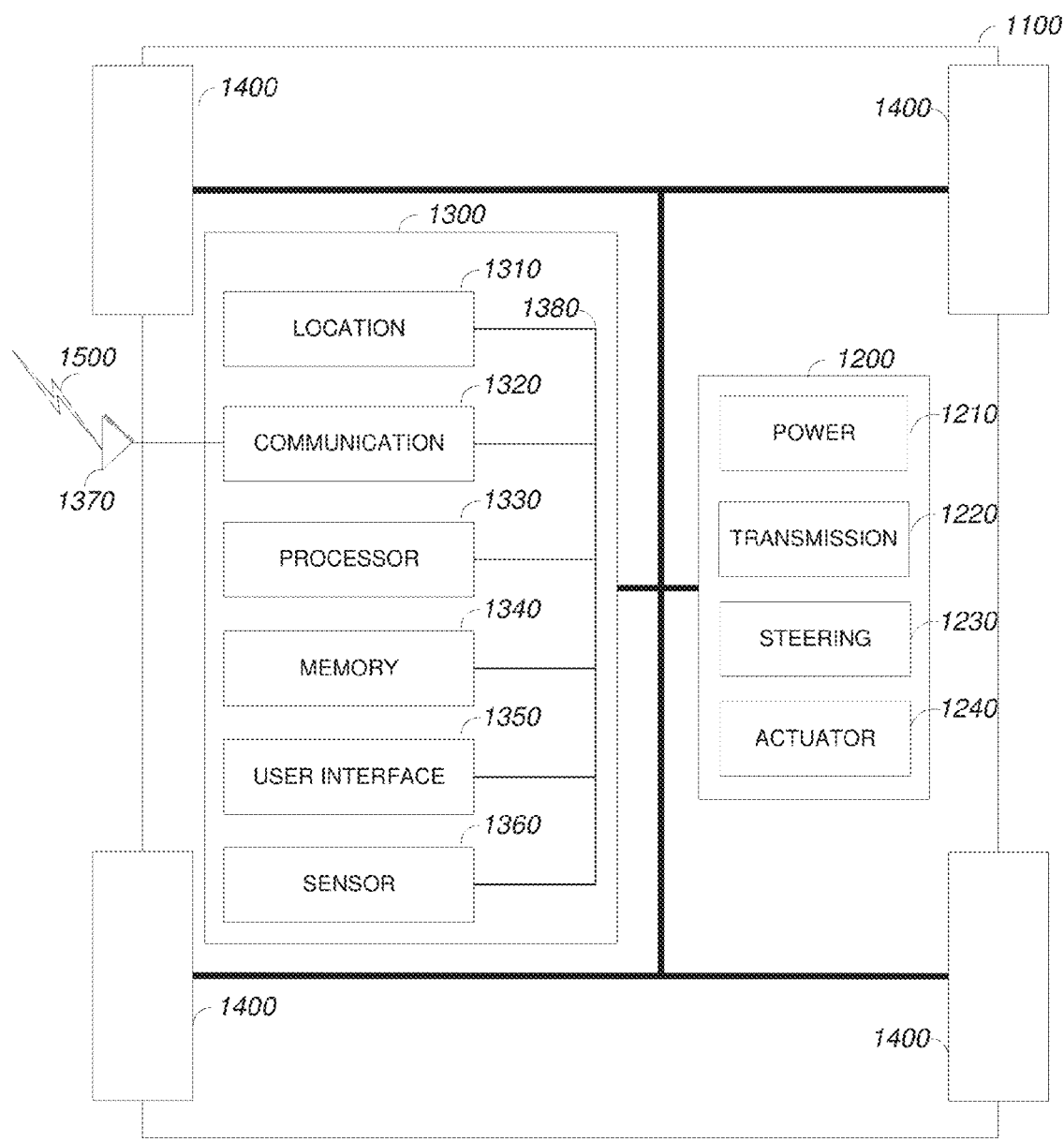
FIG. 1 is a diagram of an example of a portion of an autonomous vehicle in which the aspects, features, and elements disclosed herein may be implemented.

An autonomous vehicle may travel from a point of origin to a destination in a vehicle transportation network without human intervention. The autonomous vehicle may include a controller, which may perform autonomous vehicle routing and navigation. The controller may generate a route of travel from the origin to the destination based on vehicle information, environment information, vehicle transportation network information representing the vehicle transportation network, or a combination thereof. The controller may output the route of travel to a trajectory controller that may operate the vehicle to travel from the origin to the destination using the generated route.

In some embodiments, routing and navigating the autonomous vehicle through the vehicle transportation network may include localizing the autonomous vehicle to accurately identify a location, which may include an orientation, a position, or both, of the autonomous vehicle in the vehicle transportation network in relation to the representation of the vehicle transportation network in the vehicle transportation network information. In some embodiments, localization may be performed based on a localization signal, such as global positioning system (GPS) information or radio triangulation information. In some embodiments, localization based on a localization signal may be inaccurate. For example, in some locations, such as a parking area, the vehicle transportation network information may be incomplete, inaccurate, or unavailable.

Marker aided autonomous vehicle localization may include accurately localizing the autonomous vehicle based on location information from the transportation network information for an uncoded localization marker, such as an uncoded symbol affixed to a road surface in a parking area, detected in the vehicle transportation network by the autonomous vehicle. In some embodiments, marker aided autonomous vehicle localization may include estimating a location of the autonomous vehicle using odometry, and generating accurate localization information based on the estimated location and the detected uncoded localization marker location information.

The embodiments of the methods disclosed herein, or any part or parts thereof, including and aspects, features, elements thereof, may be implemented in a computer program, software, or firmware, or a portion thereof, incorporated in a tangible non-transitory computer-readable or computer-usable storage medium for execution by a general purpose or special purpose computer or processor.

As used herein, the terminology "computer" or "computing device" includes any unit, or combination of units, capable of performing any method, or any portion or portions thereof, disclosed herein.

As used herein, the terminology "processor" indicates one or more processors, such as one or more general purpose processors, one or more special purpose processors, one or more conventional processors, one or more digital signal processors, one or more microprocessors, one or more controllers, one or more microcontrollers, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read only memories (ROM), one or more random access memories (RAM), one or more registers, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

FIG. 1 is a diagram of an example of an autonomous vehicle in which the aspects, features, and elements disclosed herein may be implemented. In some embodiments, an autonomous vehicle 1000 may include a chassis 1100, a powertrain 1200, a controller 1300, wheels 1400, or any other element or combination of elements of an autonomous vehicle. Although the autonomous vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the autonomous vehicle 1000, which may include accelerating, decelerating, steering, or otherwise controlling the autonomous vehicle 1000.

The powertrain 1200 may include a power source 1210, a transmission 1220, a steering unit 1230, an actuator 1240, or any other element or combination of elements of a powertrain, such as a suspension, a drive shaft, axels, or an exhaust system. Although shown separately, the wheels 1400 may be included in the powertrain 1200.

The power source 1210 may include an engine, a battery, or a combination thereof. The power source 1210 may be any device or combination of devices operative to provide energy, such as electrical energy, thermal energy, or kinetic energy. For example, the power source 1210 may include an engine, such as an internal combustion engine, an electric motor, or a combination of an internal combustion engine and an electric motor, and may be operative to provide kinetic energy as a motive force to one or more of the wheels 1400. In some embodiments, the power source 1400 may include a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 may receive energy, such as kinetic energy, from the power source 1210, and may transmit the energy to the wheels 1400 to provide a motive force. The transmission 1220 may be controlled by the control unit 1300 the actuator 1240 or both. The steering unit 1230 may be controlled by the control unit 1300 the actuator 1240 or both and may control the wheels 1400 to steer the autonomous vehicle. The vehicle actuator 1240 may receive signals from the controller 1300 and may actuate or control the power source 1210, the transmission 1220, the steering unit 1230, or any combination thereof to operate the autonomous vehicle 1000.

In some embodiments, the controller 1300 may include a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

In some embodiments, the processor 1330 may include any device or combination of devices capable of manipulating or processing a signal or other information now-existing or hereafter developed, including optical processors, quantum processors, molecular processors, or a combination thereof. For example, the processor 1330 may include one or more general purpose processors, one or more special purpose processors, one or more digital signal processors, one or more microprocessors, one or more controllers, one or more microcontrollers, one or more integrated circuits, one or more an Application Specific Integrated Circuits, one or more Field Programmable Gate Array, one or more programmable logic arrays, one or more programmable logic controllers, one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively couple with the memory 1340 via a communication bus 1380.

The memory 1340 may include any tangible non-transitory computer-usable or computer-readable medium, capable of, for example, containing, storing, communicating, or transporting machine readable instructions, or any information associated therewith, for use by or in connection with the processor 1330. The memory 1340 may be, for example, one or more solid state drives, one or more memory cards, one or more removable media, one or more read only memories, one or more random access memories, one or more disks, including a hard disk, a floppy disk, an optical disk, a magnetic or optical card, or any type of non-transitory media suitable for storing electronic information, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, an autonomous vehicle may include any number of communication interfaces.

The communication unit 1320 may be configured to transmit or receive signals via a wired or wireless medium 1500, such as via the communication interface 1370. Although not explicitly shown in FIG. 1, the communication unit 1320 may be configured to transmit, receive, or both via any wired or wireless communication medium, such as radio frequency (RF), ultra violet (UV), visible light, fiber optic, wire line, or a combination thereof. Although FIG. 1 shows a single communication unit 1320 and a single communication interface 1370, any number of communication units and any number of communication interfaces may be used.

The location unit 1310 may perform localization for the autonomous vehicle. Localization may include determining geolocation information, such as longitude, latitude, elevation, direction of travel, or speed, of the autonomous vehicle 1000. In some embodiments, localization may be performed based on a localization signal. For example, the location unit may include a global positioning system (GPS) unit, a radio triangulation unit, or a combination thereof, and may receive a localization signal indicating the geolocation information for the autonomous vehicle. The location unit 1310 can be used to obtain information that represents, for example, a current heading of the autonomous vehicle 1000, a current position of the autonomous vehicle 1000 in two or three dimensions, a current angular orientation of the autonomous vehicle 1000, or a combination thereof.

The user interface 1350 may include any unit capable of interfacing with a person, such as a virtual or physical keypad, a touchpad, a display, a touch display, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include an audio interface for performing audio communication with a person, and a touch display for performing visual and touch based communication with the person.

The sensor 1360 may include one or more sensors, such as an array of sensors, which may be operable to provide information that may be used to control the autonomous vehicle. The sensors 1360 may provide information regarding current operating characteristics of the vehicle. The sensors 1360 can include, for example, a speed sensor, acceleration sensors, a steering angle sensor, traction-related sensors, braking-related sensors, or any sensor, or combination of sensors, that is operable to report information regarding some aspect of the current dynamic situation of the autonomous vehicle 1000.

In some embodiments, the sensors 1360 may include sensors that are operable to obtain information regarding the physical environment surrounding the autonomous vehicle 1000. For example, one or more sensors may detect road geometry and obstacles, such as fixed obstacles, vehicles, and pedestrians. In some embodiments, the sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 may be combined.

Although not shown separately, in some embodiments, the autonomous vehicle 1000 may include a trajectory controller. For example, the controller 1300 may include the trajectory controller. The trajectory controller may be operable to obtain information describing a current state of the autonomous vehicle 1000 and a rout planned for the autonomous vehicle 1000, and, based on this information, to determine and optimize a trajectory for the autonomous vehicle 1000. In some embodiments, the trajectory controller may output signals operable to control the autonomous vehicle 1000 such that the autonomous vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel, which may be pivoted to a steering angle under control of the steering unit 1230, a propelled wheel, which may be torqued to propel the autonomous vehicle 1000 under control of the transmission 1220, or a steered and propelled wheel that may steer and propel the autonomous vehicle 1000.

Although not shown in FIG. 1, an autonomous vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
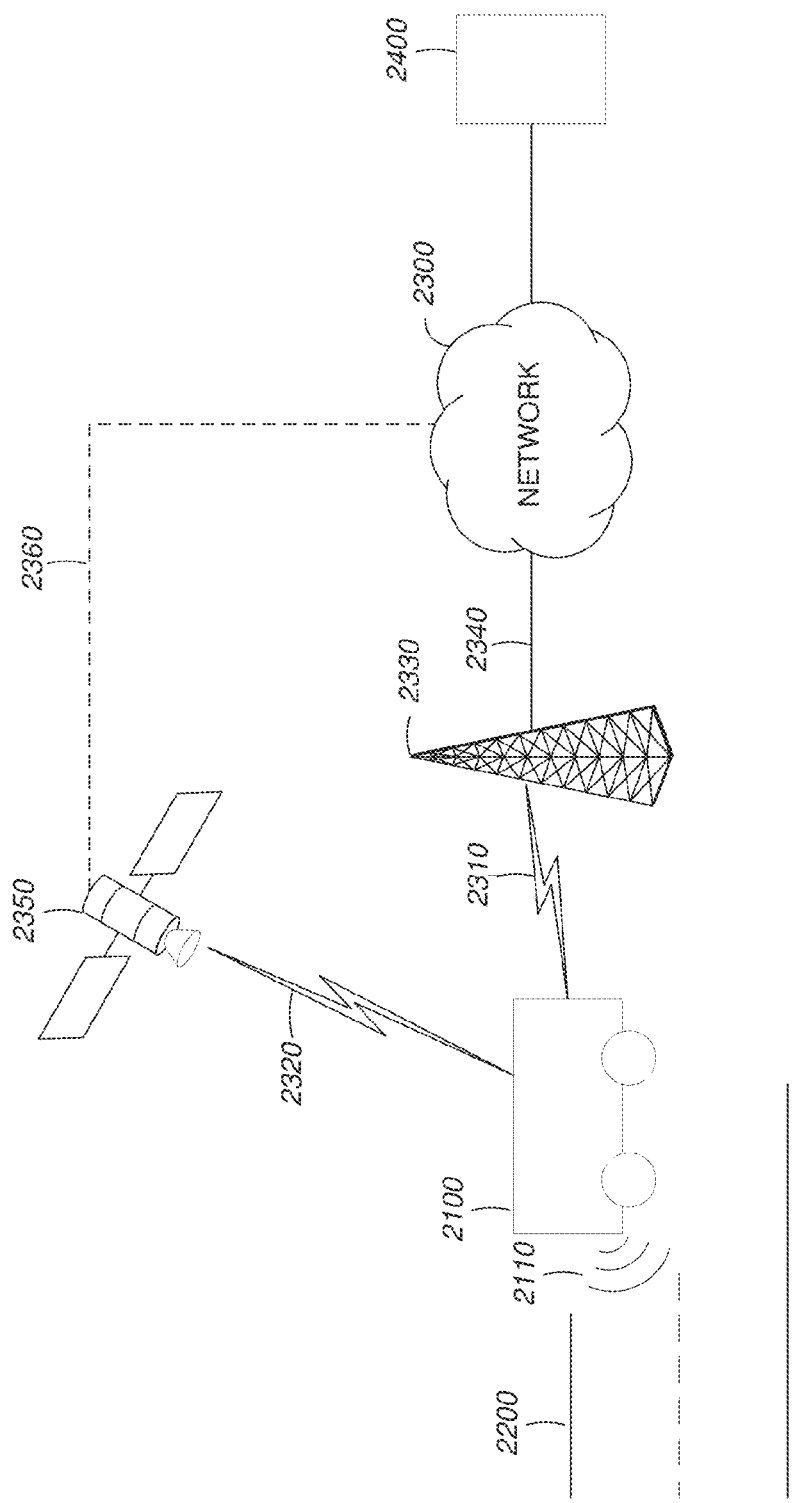
FIG. 2 is a diagram of an example of a portion of an autonomous vehicle transportation and communication system in which the aspects, features, and elements disclosed herein may be implemented.

FIG. 2 is a diagram of an example of a portion of an autonomous vehicle transportation and communication system in which the aspects, features, and elements disclosed herein may be implemented. The autonomous vehicle transportation and communication system 2000 may include one or more autonomous vehicles 2100, such as the autonomous vehicle 1000 shown in FIG. 1, which may travel via one or more portions of one or more vehicle transportation networks 2200, and may communicate via one or more electronic communication networks 2300. Although not explicitly shown in FIG. 2, an autonomous vehicle may traverse an area that is not expressly or completely included in a vehicle transportation network, such as an off-road area.

In some embodiments, the electronic communication network 2300 may be, for example, a multiple access system and may provide for communication, such as voice communication, data communication, video communication, messaging communication, or a combination thereof, between the autonomous vehicle 2100 and one or more communicating devices 2400. For example, an autonomous vehicle 2100 may receive information, such as information representing the vehicle transportation network 2200, from a communicating device 2400 via the network 2300.

In some embodiments, an autonomous vehicle 2100 may communicate via a wired communication link (not shown), a wireless communication link 2310/2320, or a combination of any number of wired or wireless communication links. For example, as shown, an autonomous vehicle 2100 may communicate via a terrestrial wireless communication link 2310, via a non-terrestrial wireless communication link 2320, or via a combination thereof. In some implementations, a terrestrial wireless communication link 2310 may include an Ethernet link, a serial link, a Bluetooth link, an infrared (IR) link, an ultraviolet (UV) link, or any link capable of providing for electronic communication.

In some embodiments, the autonomous vehicle 2100 may communicate with the communications network 2300 via an access point 2330. An access point 2330, which may include a computing device, may be configured to communicate with an autonomous vehicle 2100, with a communication network 2300, with one or more communicating devices 2400, or with a combination thereof via wired or wireless communication links 2310/2340. For example, an access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point may include any number of interconnected elements.

In some embodiments, the autonomous vehicle 2100 may communicate with the communications network 2300 via a satellite 2350, or other non-terrestrial communication device. A satellite 2350, which may include a computing device, may be configured to communicate with an autonomous vehicle 2100, with a communication network 2300, with one or more communicating devices 2400, or with a combination thereof via one or more communication links 2320/2360. Although shown as a single unit, a satellite may include any number of interconnected elements.

An electronic communication network 2300 may be any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network may include any number of interconnected elements.

In some embodiments, an autonomous vehicle 2100 may identify a portion or condition of the vehicle transportation network 2200. For example, the autonomous vehicle may include one or more on-vehicle sensors 2110, such as sensor 1360 shown in FIG. 1, which may include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200.

In some embodiments, an autonomous vehicle 2100 may traverse a portion or portions of one or more vehicle transportation networks 2200 using information communicated via the network 2300, such as information representing the vehicle transportation network 2200, information identified by one or more on-vehicle sensors 2110, or a combination thereof.

Although, for simplicity, FIG. 2 shows one autonomous vehicle 2100, one vehicle transportation network 2200, one electronic communication network 2300, and one communicating device 2400, any number of autonomous vehicles, networks, or computing devices may be used. In some embodiments, the autonomous vehicle transportation and communication system 2000 may include devices, units, or elements not shown in FIG. 2. Although the autonomous vehicle 2100 is shown as a single unit, an autonomous vehicle may include any number of interconnected elements.

Figure 3:
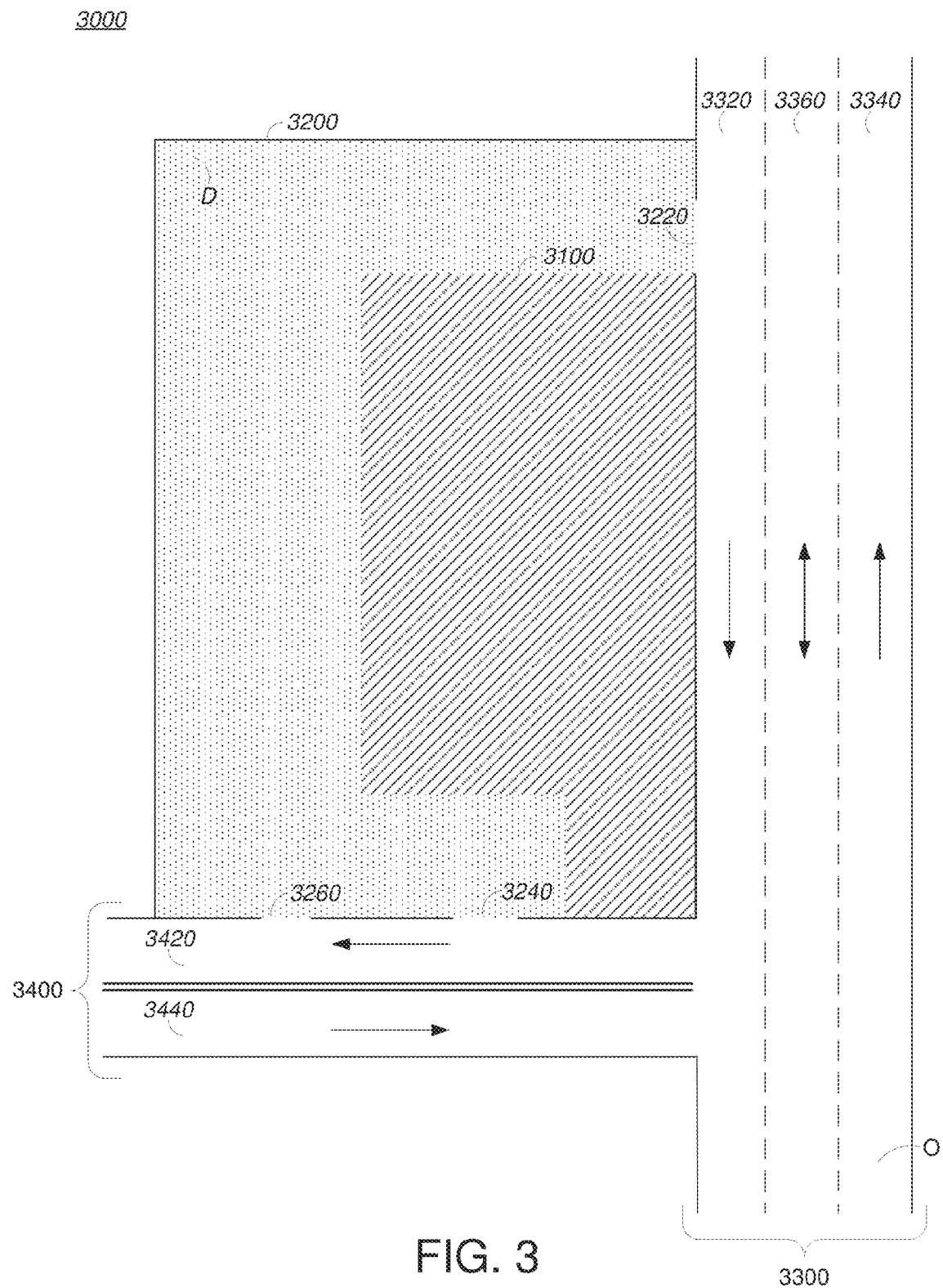
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the autonomous vehicle 1000 shown in FIG. 1 or the autonomous vehicle 2100 shown in FIG. 2, may traverse a portion or portions of the vehicle transportation network 3000. For example, an autonomous vehicle may travel from an origin O to a destination D.

The vehicle transportation network may include one or more interchanges 3220/3240/3260 between one or more navigable, or partially navigable, areas 3200/3300/3400. For example, the portion of the vehicle transportation network shown in FIG. 3 includes an interchange 3220 between the parking area 3200 and road 3300 and two interchanges 3240/3260 between the parking area 3200 and road 3400.

A portion of the vehicle transportation network, such as a road 3300/3400 may include one or more lanes 3320/3340/3360/3420/3440, and may be associated with one or more directions of travel, which are indicated by arrows in FIG. 3.

Figure 4:
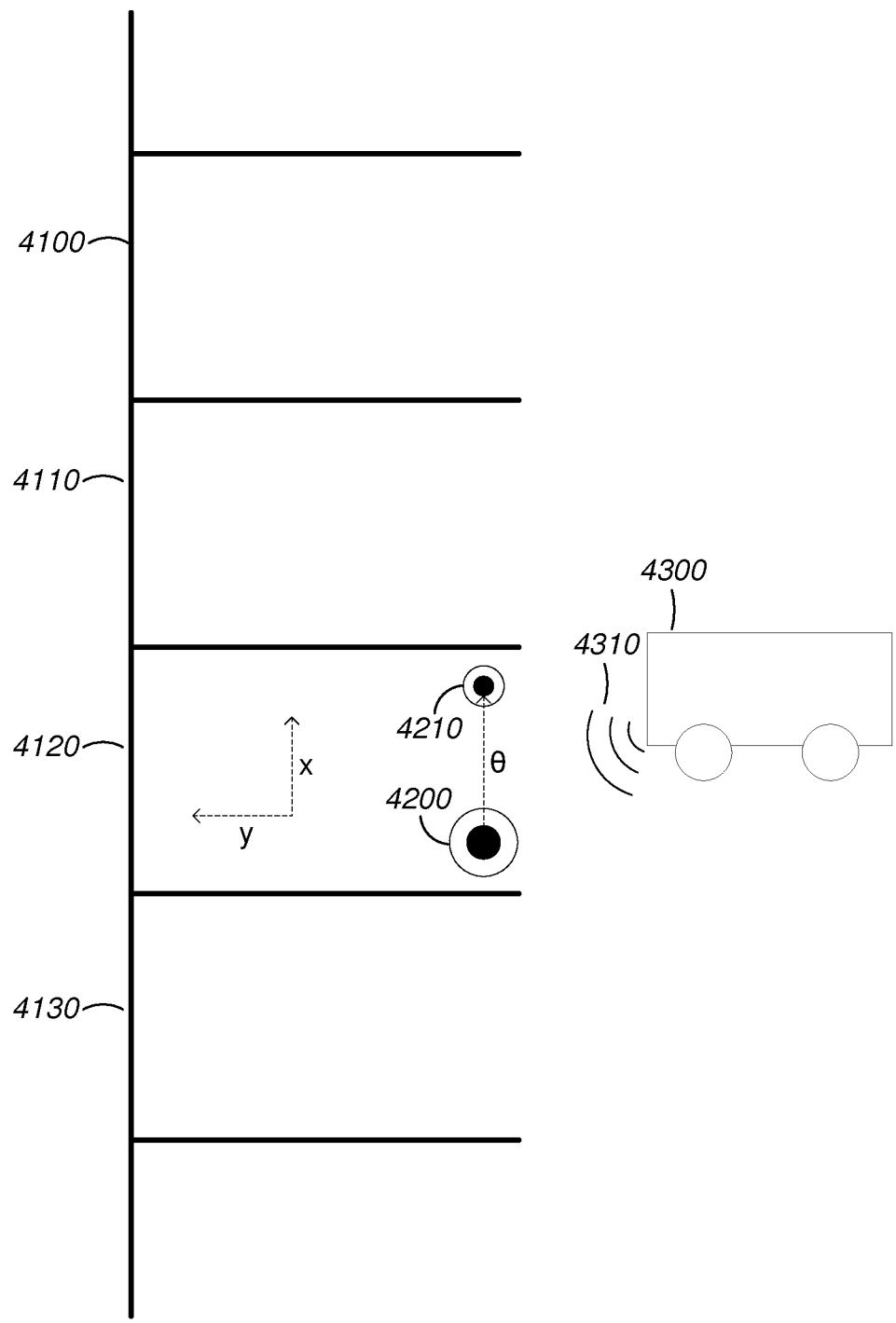
FIG. 4 is a diagram of a portion of a vehicle transportation network for marker aided autonomous vehicle localization in accordance with this disclosure.
Figure 5:
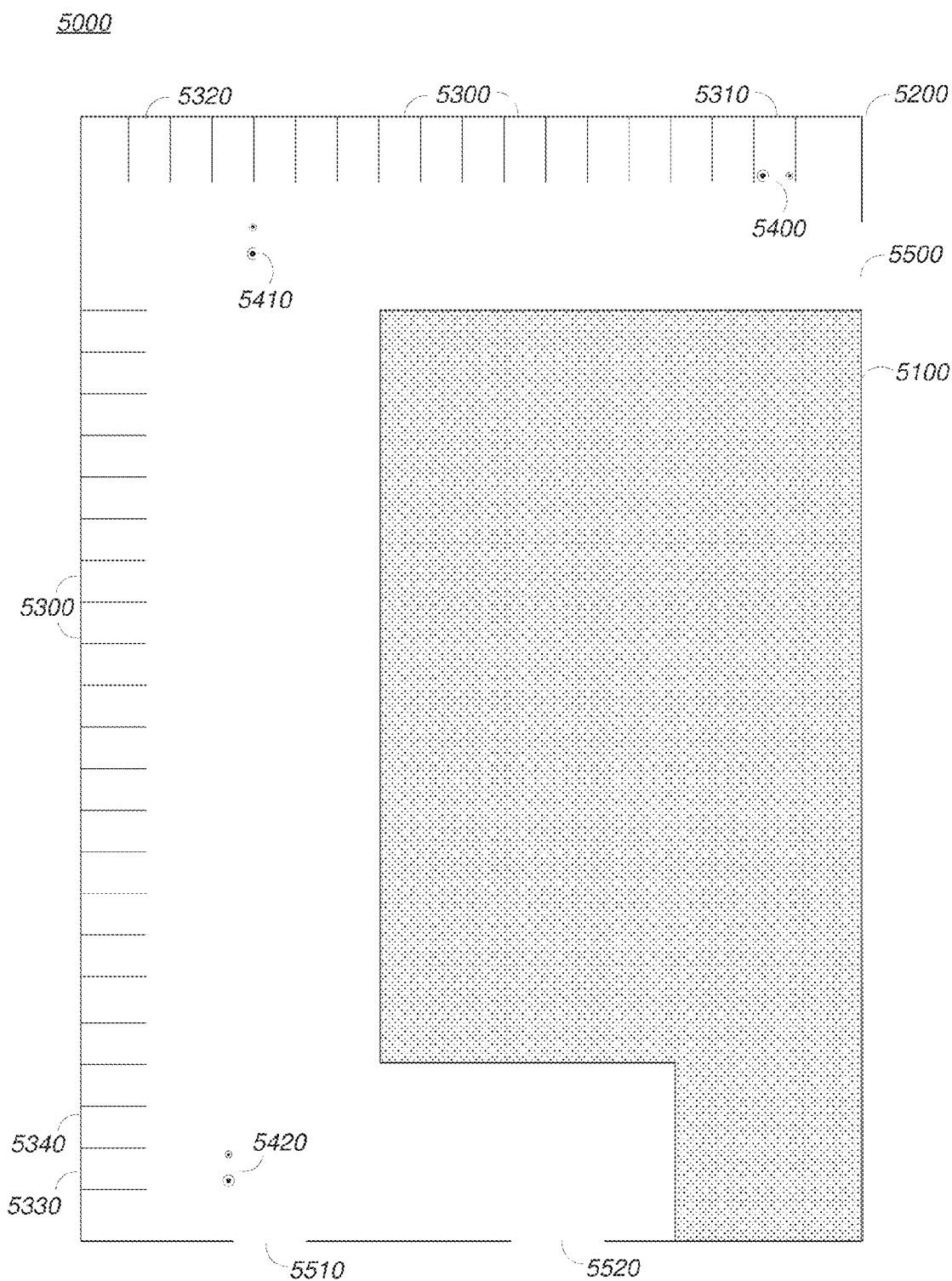
FIG. 5 is a diagram of another portion of a vehicle transportation network for marker aided autonomous vehicle localization in accordance with this disclosure.

In some embodiments, a vehicle transportation network, or a portion thereof, such as the portion of the vehicle transportation network shown in FIG. 3, may be represented as vehicle transportation network information. For example, vehicle transportation network information may be expressed as a hierarchy of elements, such as markup language elements, which may be stored in a database or file. For simplicity, FIGS. 4 and 5 depict vehicle transportation network information representing the portion of vehicle transportation network shown in FIG. 3 as diagrams or maps, however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information, or a combination thereof.

FIG. 4 is a diagram of a portion of a vehicle transportation network for marker aided autonomous vehicle localization in accordance with this disclosure. In some embodiments, routing or navigating an autonomous vehicle, such as the autonomous vehicle 1000 shown in FIG. 1 or the autonomous vehicle 2100 shown in FIG. 2, may include performing localization to determining a current location of the autonomous vehicle. For example, a location unit, such as the location unit 1310 shown in FIG. 1, may determine geolocation information, such as longitude, latitude, elevation, direction of travel, or speed, of the autonomous vehicle. In some embodiments, the location unit may include a global positioning system (GPS) unit, a radio triangulation unit, or a combination thereof. The location unit may determine information that represents a current heading of the autonomous vehicle, a current position of the autonomous vehicle in two or three dimensions, a current angular orientation of the autonomous vehicle, or a combination thereof.

In some embodiments, localization based on a localization signal, such as GPS information or radio triangulation information, may be inaccurate. For example, in some locations, such as the parking area 3200 shown in FIG. 3, the vehicle transportation network information may be incomplete or inaccurate. In another example, the localization signal may be unavailable or inaccurate, such as in a covered parking area. As used herein, the terminology "partially navigable" includes navigable portions of a vehicle transportation network for which vehicle transportation network information is unreliable, incomplete, inaccurate, or unavailable, or for which a localization signal is unreliable, incomplete, inaccurate, or unavailable.

In some embodiments, determining a current location of the autonomous vehicle may include marker aided autonomous vehicle localization. The portion of the vehicle transportation network shown in FIG. 4 includes a partially navigable parking area 4000 that includes parking slots 4100/4110/4120/4130. As shown, one of the parking slots 4120 includes an uncoded localization marker 4200/4210.

In some embodiments, the uncoded localization marker 4200/4210 may include two portions, and each portion may include concentric circles of contrasting colors, such as a black circle within a white circle with a black boarder, as shown. In some embodiments, other implementations of the uncoded localization marker may be used. For example, the black boarder may be omitted. Although the uncoded localization marker 4200/4210 is shown as two portions, each including concentric circles of contrasting colors, other distinguishable implementations may be used. For example, a localization marker may include one portion including a black arrow within a white box with a black boarder. In some embodiments, the localization markers 4200/4210 may include a primary localization marker portion 4200 and a secondary localization marker portion 4210. In some embodiments, the secondary localization marker portion 4210 may be distinguishable from the primary localization marker portion 4200. For example, the secondary localization marker portion 4210 may be distinguishably smaller than the primary localization marker portion 4200, as shown.

Although not shown in FIG. 4, a vehicle transportation network may include coded localization markers. Each coded localization marker may be uniquely identifiable, independently of other localization information, and may correspond with a uniquely identified location in the transportation network information. For example, the transportation network information may include information representing a partially navigable portion of a vehicle transportation network, the partially navigable portion of the vehicle transportation network may include a series of coded localization markers, each of the coded localization markers may include a unique localization marker identifier, such as a unique identification number or a Quick Response (QR) Code, and the transportation network information may include location information corresponding to each unique localization marker identifier. Independent of location in the vehicle transportation network, a first coded localization marker may include a first unique localization marker identifier, a second coded localization marker may include a second unique localization marker identifier, and the first coded localization marker may be distinguishable from the second coded localization marker. For example, the first coded localization marker may be located immediately adjacent to the second coded localization marker, such that a distance between the first coded localization marker and the second coded localization marker is smaller than a minimum distance resolution for localization, and the first coded localization marker may be uniquely identifiable and locationally distinguishable from the second coded localization marker. The first coded location marker may not appear substantially identical to the second coded location marker.

An uncoded localization marker, such as the uncoded localization marker 4200/4210 shown in FIG. 4, may be indistinguishable from another uncoded localization marker independently of location in the vehicle transporation network, and an uncoded localization marker may exclude a unique localization marker identifier. For example, a first uncoded localization marker may be located immediately adjacent to a second uncoded localization marker, such that a distance between the first uncoded localization marker and the second uncoded localization marker is smaller than a minimum distance resolution for localization, and the first uncoded localization marker may be locationally indistinguishable from the second uncoded localization marker. The first uncoded location may appear substantially identical to the second uncoded location marker. In some embodiments, each uncoded localization marker may be an instance of an invariant localization marker design. For example, the pair of a large concentric circle portion 4200 and a small concentric circle portion 4210 shown in FIG. 4 may represent a localization marker design, and each instance of an uncoded localization marker may depict the localization marker design without relevant distinguishing visible characteristics or features. In some embodiments, instances of uncoded localization markers may include insignificant or irrelevant variations. For example, transporation network information may omit color information for the uncoded localization markers, and the color of an uncoded localization marker may vary from the color of another uncoded localization marker.

The uncoded localization marker 4200/4210 may be configured to provide two dimensional position and orientation information. In some embodiments, the uncoded localization marker 4200/4210 may be oriented in a defined location. For example, the uncoded localization marker 4200/4210 may be painted or otherwise affixed to the parking area driving surface. In some embodiments, the vehicle transportation network information for the parking area 4000 may be incomplete or imprecise, or GPS information may be unavailable for the parking area 4000.

In some embodiments, an autonomous vehicle 4300, such as the autonomous vehicle 1000 shown in FIG. 1 or the autonomous vehicle 2100 shown in FIG. 2, may detect the localization markers 4200/4210 using a sensor 4310, such as the sensor 1360 shown in FIG. 1 or the sensor 2110 shown in FIG. 2. For example, the vehicle 4300 may include a camera 4310 configured to detect the localization markers 4200/4210. Although FIG. 4 shows a single orientation of the autonomous vehicle 4300 with respect to the localization markers 4200/4210, any orientation wherein the autonomous vehicle 4300 can detect and distinguish the localization markers 4200/4210 may be used. For example, the autonomous vehicle 4300 may include multiple cameras, such as four cameras, configured to detect the localization markers 4200/4210 within a defined distance in any direction from the autonomous vehicle 4300.

In some embodiments, the vehicle transportation network information may include location information for the localization markers 4200/4210. For example, the location information for the localization markers 4200/4210 may include information identifying a position of the primary localization marker 4200, which may include local coordinates, such as a horizontal (x) coordinate and a vertical (y) coordinate. The location information for the localization markers 4200/4210 may include information indicating a direction (A) of the secondary localization marker 4210 from the primary localization marker 4200. The location information for the localization markers 4200/4210 may include information indicating the size of one or both of the localization markers 4200/4210.

FIG. 5 is a diagram of another portion of a vehicle transportation network for marker aided autonomous vehicle localization in accordance with this disclosure. The portion of the vehicle transportation network 5000 shown in FIG. 5 includes an unnavigable area 5100, and a partially navigable parking area 5200. The parking area 5200 includes multiple parking slots 5300/5310/5320/5330/5340 and sparsely located uncoded localization markers 5400/5410/5420. As used herein, the term 'sparsely located' indicates that a distance between the uncoded localization markers 5400/5410/5420 exceeds a minimum distance threshold whereby uncoded localization markers are distinguishable. For example, the distance between the parking slot 5330 in the bottom left corner, and the immediately adjacent slot 5340 may be below the minimum distance threshold and the slot 5340 may not include a sparsely located uncoded localization marker. A location for the portion 5200 of the vehicle transportation network may be indicated in the transportation network information. The transportation network information may include information indicating a location of a first sparsely located uncoded localization marker 5400, a location of a second sparsely located uncoded localization marker 5410, and a location of a third sparsely located uncoded localization marker 5420. In some embodiments, the sparsely located uncoded localization markers 5400/5410/5420 may be located in a parking slot, or may be located in a vehicle pathway. For example, in FIG. 5, the sparsely located uncoded localization marker 5400 is shown in a parking slot, and the sparsely located uncoded localization markers 5410/5420 are shown in a vehicle pathway.

An autonomous vehicle (not shown) may determine the location of the portion 5200 from the transportation network information. In addition, or alternatively, the autonomous vehicle may determine accurate localization at a location immediately adjacent to the portion 5200. The autonomous vehicle may enter the portion 5200. The autonomous vehicle may detect one of the sparsely located uncoded localization markers 5400/5410/5420, and the autonomous vehicle may perform marker aided autonomous vehicle localization to generate accurate localization information based on the location defined for the detected location marker and the localization information determined at the location immediately adjacent to the portion 5200.

For example, the autonomous vehicle may enter the parking lot 5200 at the entrance 5500 near the top right corner, the autonomous vehicle may determine it is entering the parking lot 5200 near the top right corner, the autonomous vehicle may detect the sparsely located uncoded localization marker 5400 located near the top right corner of the parking lot 5200, the autonomous vehicle may identify location information indicating a location for each of the sparsely located uncoded localization markers 5400/5410/5420 in the parking lot 5200, the autonomous vehicle may determine that the location information indicates that a sparsely located uncoded localization marker is located near the top right entrance to the parking lot 5200, the autonomous vehicle may determine that the detected sparsely located uncoded localization marker corresponds with the location information indicated for the sparsely located uncoded localization marker 5400, and the autonomous vehicle may accurately identify localization information based on the location information indicated for the sparsely located uncoded localization marker 5400.

In another example, the autonomous vehicle may enter the parking lot 5200 at the entrance 5510 near the bottom left corner, the autonomous vehicle may determine it is entering the parking lot 5200 near the bottom left corner, the autonomous vehicle may detect the sparsely located uncoded localization marker 5420 located near the bottom left corner of the parking lot 5200, the autonomous vehicle may identify location information indicating a location for each of the sparsely located uncoded localization markers 5400/5410/5420 in the parking lot 5200, the autonomous vehicle may determine that the location information indicates that a sparsely located uncoded localization marker is located near the bottom left entrance to the parking lot 5200, the autonomous vehicle may determine that the detected sparsely located uncoded localization marker corresponds with the location information indicated for the sparsely located uncoded localization marker 5420, and the autonomous vehicle may accurately identify localization information based on the location information indicated for the sparsely located uncoded localization marker 5420.

In another example, the autonomous vehicle may enter the parking lot 5200 at the entrance 5520 near the bottom center, the autonomous vehicle may determine it is entering the parking lot 5200 near the bottom, the autonomous vehicle may traverse the parking lot 5200 from the entrance 5520 to a location near the parking slot 5330, the autonomous vehicle may detect the sparsely located uncoded localization marker 5420 located near the bottom left corner of the parking lot 5200, the autonomous vehicle may identify location information indicating a location for each of the sparsely located uncoded localization markers 5400/5410/5420 in the parking lot 5200, the autonomous vehicle may determine that the location information indicates that a sparsely located uncoded localization marker is located near the bottom left corner of the parking lot 5200, the autonomous vehicle may determine that the detected sparsely located uncoded localization marker corresponds with the location information indicated for the sparsely located uncoded localization marker 5420, and the autonomous vehicle may accurately identify localization information based on the location information indicated for the sparsely located uncoded localization marker 5420.

In another example, the autonomous vehicle may enter the parking lot 5200 at the entrance 5500 near the top right corner, and the autonomous vehicle may determine it is entering the parking lot 5200 near the top right corner. The autonomous vehicle may not detect the sparsely located uncoded localization marker 5400 located near the top right corner of the parking lot 5200. For example, the sparsely located uncoded localization marker 5400 located near the top right corner of the parking lot 5200 may be obscured. The autonomous vehicle may traverse the parking lot 5200 from the entrance 5500 to a location near the parking slot 5320. The autonomous vehicle may detect the sparsely located uncoded localization marker 5410 located near the top left corner of the parking lot 5200, and the autonomous vehicle may identify location information indicating a location for each of the sparsely located uncoded localization markers 5400/5410/5420 in the parking lot 5200. The autonomous vehicle may determine that the location information indicates that a sparsely located uncoded localization marker is located near the top left corner to the parking lot 5200. The autonomous vehicle may estimate, based, for example, on odometry, a current location near the top left corner of the parking lot 5200, the autonomous vehicle may determine that the detected sparsely located uncoded localization marker corresponds with the location information indicated for the sparsely located uncoded localization marker 5410, and the autonomous vehicle may accurately identify localization information based on the location information indicated for the sparsely located uncoded localization marker 5410.

Figure 6:
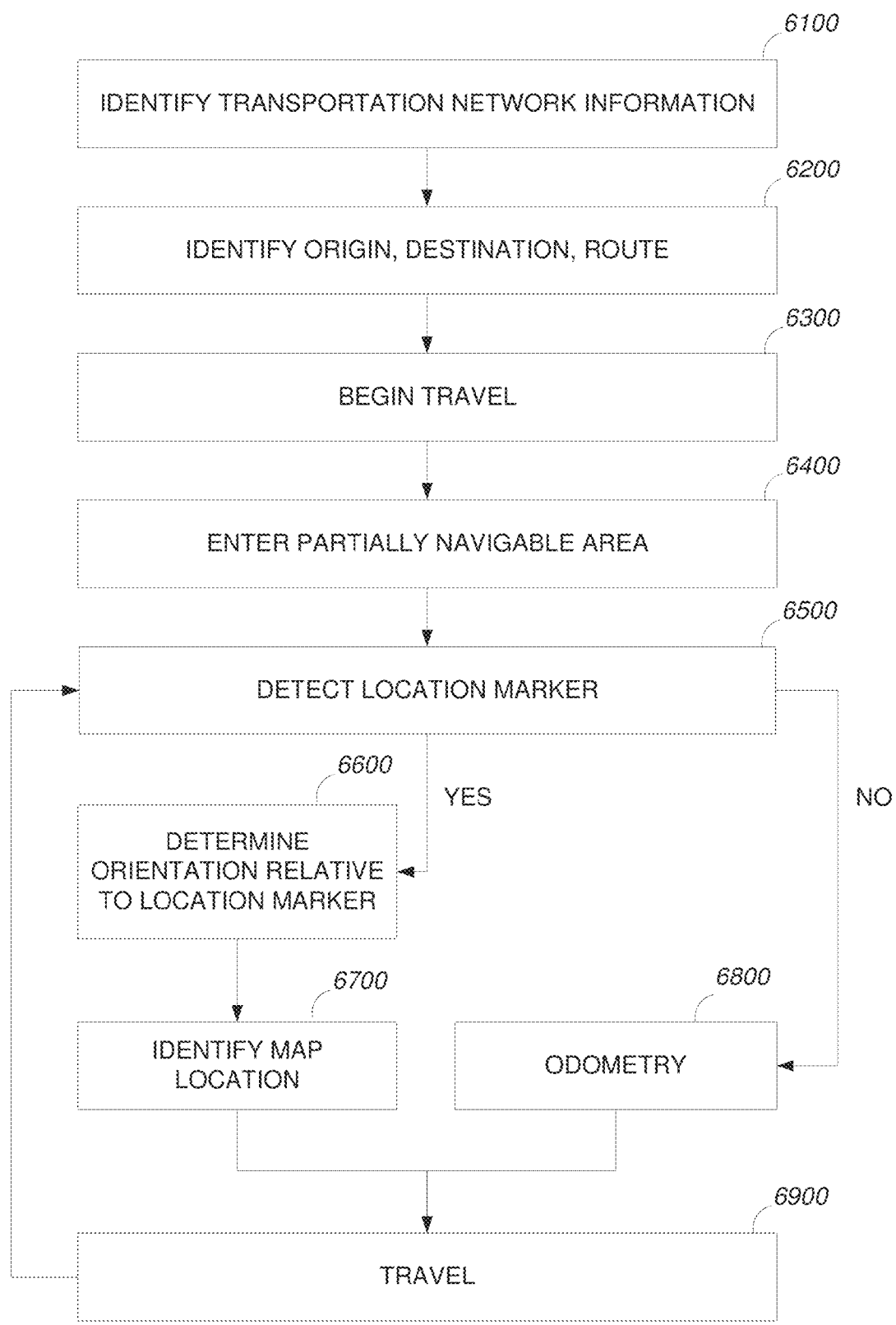
FIG. 6 is a diagram of a method of marker aided autonomous vehicle localization in accordance with this disclosure.

FIG. 6 is a diagram of a method of marker aided autonomous vehicle localization in accordance with this disclosure. Marker aided autonomous vehicle localization may be implemented in an autonomous vehicle, such as the autonomous vehicle 1000 shown in FIG. 1 or the autonomous vehicle 2100 shown in FIG. 2. For example, the processor 1330 of the controller 1300 of the autonomous vehicle 1000 shown in FIG. 1 may execute instructions stored on the memory 1340 of the controller 1300 of the autonomous vehicle 1000 shown in FIG. 1 to perform marker aided autonomous vehicle localization. Implementations of marker aided autonomous vehicle localization may include identifying vehicle transportation network information at 6100, identifying an origin, a destination, and a route at 6200, beginning travel at 6300, entering a partially navigable area at 6400, detecting a localization marker at 6500, determining an orientation relative to the detected localization marker at 6600, generating accurate localization information at 6700, generating estimated localization based on odometry at 6800, or a combination thereof.

In some embodiments, vehicle transportation network information, such as the vehicle transportation network information shown in FIGS. 3-5, may be identified at 6100. For example, an autonomous vehicle control unit, such as the controller 1300 shown in FIG. 1, may read the vehicle transportation network information from a data storage unit, such as the memory 1340 shown in FIG. 1, or may receive the vehicle transportation network information from an external data source, such as the communicating device 2400 shown in FIG. 2, via a communication system, such as the electronic communication network 2300 shown in FIG. 2.

In some embodiments, the vehicle transportation network may include a partially navigable area, such as the partially navigable area 3200 shown in FIG. 3, the partially navigable area 4000 shown in FIG. 4, or the partially navigable area 5200 shown in FIG. 5. The vehicle transportation network information may include information identifying a location of the partially navigable area. The vehicle transportation network information may include information indicating that the partially navigable area includes one or more sparsely located uncoded localization markers, such as the sparsely located uncoded localization marker 4200/4210 shown in FIG. 4 or the sparsely located uncoded localization markers 5400/5410/5420 shown in FIG. 5. The vehicle transportation network information may include information indicating a defined location for each sparsely located uncoded localization marker. The sparsely located uncoded localization markers may be indistinguishable independently of other location information.

In some embodiments, identifying the vehicle transportation network information may include transcoding or reformatting the vehicle transportation network information, storing the reformatted vehicle transportation network information, or both.

In some embodiments, an origin, a destination, and a route may be identified at 6200. For example, the origin may indicate a target starting point, such as a current location of the autonomous vehicle. In some embodiments, identifying the origin may include controlling a location unit, such as the location unit 1310 shown in FIG. 1, to determine a current geographic location of the autonomous vehicle. In some embodiments, identifying the origin at 6200 may include identifying vehicle transportation network information corresponding to the origin. For example, identifying the origin may include identifying a road, road segment, lane, waypoint, or a combination thereof. In some embodiments, the current location of the autonomous vehicle may be a navigable non-road area or an area that is not expressly or completely included in a vehicle transportation network, such as an off-road area, and identifying the origin may include identifying a road, road segment, lane, waypoint, or a combination thereof, near, or proximal to, the current location of the autonomous vehicle. In some embodiments, identifying the destination may include identifying vehicle transportation network information representing a target location within the vehicle transportation network. For example, identifying the destination may include identifying a road, road segment, lane, waypoint, or a combination thereof, in the vehicle transportation network information. In some embodiments, the target location may be a navigable non-road area or an area that is not expressly or completely included in a vehicle transportation network, such as an off-road area, and identifying the destination may include identifying a road, road segment, lane, waypoint, or a combination thereof, near, or proximal to, the target destination location. Navigating from the origin to the destination using an identified route may include traversing at least a portion of the partially navigable area. For example, the partially navigable area may be a parking lot associated with the destination.

In some embodiments, the autonomous vehicle may begin traveling from the origin to the destination using the route at 6300. For example, the autonomous vehicle may include a vehicle actuator, such as the actuator 1240 shown in FIG. 1, and vehicle actuator may operate the autonomous vehicle to begin traveling from the origin to the destination using the route. In some embodiments, the autonomous vehicle may include a trajectory controller and the trajectory controller may operate the autonomous vehicle to begin travelling based on the route and current operating characteristics of the autonomous vehicle, and the physical environment surrounding the autonomous vehicle.

In some embodiments, the autonomous vehicle may enter the partially navigable area at 6400. Although not shown separately in FIG. 6, the autonomous vehicle may generate accurate localization information at a location adjacent to the partially navigable area.

In some embodiments, a sparsely located uncoded localization marker may be detected at 6500. In some embodiments, the autonomous vehicle may include a sensor, such as the sensor 1360 shown in FIG. 1 or the sensor 2110 shown in FIG. 2, which may be a camera, and may detect the sparsely located uncoded localization marker using the sensor. The detected sparsely located uncoded localization marker may be one of the sparsely located uncoded localization markers identified for the partially navigable area in the transportation network information. The characteristics and features of the sparsely located uncoded localization marker detected by the sensor may be indistinguishable from characteristics and features of other sparsely located uncoded localization markers.

In some embodiments, the sensor configured may be configured to detect uncoded localization marker within an area proximate to the autonomous vehicle. For example, the sensor may include one or more cameras configured to capture images of the area, such as the driving surface, surrounding the autonomous vehicle, and analyze the captured images to detect uncoded localization markers. In some embodiments, the autonomous vehicle may control the sensor to monitor the area near the autonomous vehicle when the autonomous vehicle is adjacent or proximal to the partially navigable portion of the vehicle transportation network.

In some embodiments, the autonomous vehicle may determine that the autonomous vehicle is adjacent or proximal to the partially navigable area based on the route, based on the unavailability of an accurate localization signal, based on the inaccuracy of the transportation network information for a portion of the vehicle transportation network adjacent or proximal to the autonomous vehicle, based on an express indication in the transportation network information identifying a portion of the vehicle transportation network adjacent or proximal to the autonomous vehicle as a partially navigable area, based on an indication of an uncoded localization marker that is adjacent or proximal to the autonomous vehicle in the transportation network information, or a combination thereof.

In some embodiments, an orientation, a position, or both, relative to the detected sparsely located uncoded localization marker may be determined at 6600. Determining the orientation and position of the autonomous vehicle relative to the detected sparsely located uncoded localization marker may include, for example, distinguishing the primary localization marker portion of the sparsely located uncoded localization marker from the secondary localization marker portion, and evaluating the transportation network information identifying the sparsely located uncoded localization markers. The location information for the sparsely located uncoded localization markers may include information identifying a position of the primary localization marker portion, which may include local two-dimensional coordinates, such as a horizontal (x) coordinate and a vertical (y) coordinate. The location information for the sparsely located uncoded localization markers may include information indicating a direction (A) of the secondary localization marker portion from the primary localization marker portion. The location information for the sparsely located uncoded localization markers may include information indicating the size of one or both of the sparsely located uncoded localization marker portions.

In some embodiments, accurate localization information may be generated at 6700. For example, the accurate localization information may be generated based on the orientation and position between the autonomous vehicle and the sparsely located uncoded localization marker generated at 6600 and a defined location for the sparsely located uncoded localization marker indicated the transportation network information. In some embodiments, determining the accurate localization information may include correlating the detected sparsely located uncoded localization marker with a defined sparsely located uncoded localization marker indicated in the transportation network information. For example, the transportation network information may include information defining multiple sparsely located uncoded localization markers for the partially navigable area, and the autonomous vehicle may determine which of the sparsely located uncoded localization markers corresponds with the detected sparsely located uncoded localization marker.

In some embodiments, the autonomous vehicle may determine which of the sparsely located uncoded localization markers corresponds with the detected sparsely located uncoded localization marker based on accurate localization information. For example, the autonomous vehicle may generate accurate localization information at a location immediately adjacent to the partially navigable area, may detect the sparsely located uncoded localization marker from the immediately adjacent location, the transportation network information may include information identifying a sparsely located uncoded localization marker location near the immediately adjacent location, and the autonomous vehicle may determine that the sparsely located uncoded localization marker located near the immediately adjacent location corresponds to the detected sparsely located uncoded localization marker.

In some embodiments, estimated localization based on odometry may be generated at 6800. For example, the autonomous vehicle may generate accurate localization information at a location immediately adjacent to the partially navigable area, the autonomous vehicle may traverse a portion of the partially navigable area without detecting a sparsely located uncoded localization marker, and the autonomous vehicle may generate estimated localization information based on generated accurate localization information and odometry. The autonomous vehicle may detect the sparsely located uncoded localization marker from the estimated location as shown at 6500, may determine an orientation, a position, or both, relative to the detected sparsely located uncoded localization marker as shown at 6600, may correlate the detected sparsely located uncoded localization marker to the defined sparsely located uncoded localization markers based on the estimated localization information, and may generate accurate localization information as shown at 6700.

In some embodiments, the autonomous vehicle may continue traversing the partially navigable area, or may complete traveling to the destination at 6900. For example, the autonomous vehicle may park near the detected sparsely located uncoded localization marker. In another example, the autonomous vehicle may traverse on or more other portions of the partially navigable area without, may generate estimated localization information based on odometry, may detect the one or more other sparsely located uncoded localization markers as shown at 6500, may determine an orientation and a position relative to the detected sparsely located uncoded localization markers as shown at 6600, may correlate the detected sparsely located uncoded localization marker to the defined sparsely located uncoded localization markers based on the estimated localization information, and may generate accurate localization information as shown at 6700.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. An autonomous vehicle comprising:
   a processor configured to execute instructions stored on a non-transitory computer readable medium to:
      identify transportation network information representing a vehicle transportation network,
      identify a route from an origin to a destination in the vehicle transportation network using the transportation network information; and
   a trajectory controller configured to operate the autonomous vehicle to travel from the origin to the destination using the route, wherein the processor is configured to:
      detect an uncoded localization marker in the vehicle transportation network,
      determine localization marker information indicating a location of the uncoded localization marker in the vehicle transportation network based on the transportation network information and an identified location of the autonomous vehicle in the vehicle transportation network,
      generate first localization information indicating an orientation and a position of the autonomous vehicle relative to the uncoded localization marker in response to detecting the uncoded localization marker, and
      generate second localization information indicating a current location of the autonomous vehicle in the vehicle transportation network based on the first localization information and the localization marker information, wherein the trajectory controller is configured to operate the autonomous vehicle to travel from the current location to the destination in response to generating the second localization information.

2. The autonomous vehicle of claim 1, wherein the transportation network information includes the localization marker information.

3. The autonomous vehicle of claim 1, wherein the uncoded localization marker is one of a plurality of sparsely located uncoded localization markers in a partially navigable portion of the vehicle transportation network, wherein each uncoded localization marker from the plurality of sparsely located uncoded localization markers is an instance of an invariant localization marker design.

4. The autonomous vehicle of claim 3, wherein the processor is configured to execute instructions stored on the non-transitory computer readable medium to:
   determine the identified location of the autonomous vehicle in the vehicle transportation network by generating third localization information indicating an estimated location of the autonomous vehicle within the partially navigable portion of the vehicle transportation network using odometry; and
   determine the localization marker information by identifying the uncoded localization marker from the plurality of sparsely located uncoded localization markers based on the third localization information.

5. The autonomous vehicle of claim 1, further comprising:
   a sensor configured to detect the uncoded localization marker on a condition that the uncoded localization marker is within an area proximate to the autonomous vehicle, and wherein the processor is configured to execute instructions stored on the non-transitory computer readable medium to detect the uncoded localization marker by:
      controlling the sensor to monitor the area proximate to the autonomous vehicle in response to determining that the autonomous vehicle is proximal to a partially navigable portion of the vehicle transportation network, and
      receiving information from the sensor indicating the detected uncoded localization marker.

6. The autonomous vehicle of claim 5, wherein the processor is configured to execute instructions stored on the non-transitory computer readable medium to:
   determine that the autonomous vehicle is proximal to the partially navigable portion of the vehicle transportation network on a condition that an accurate localization signal is unavailable, the transportation network information omits an accurate representation of a portion of the vehicle transportation network proximal to the autonomous vehicle, the transportation network information includes a partially navigable status indication for a portion of the vehicle transportation network proximal to the autonomous vehicle, or the transportation network information indicates that the uncoded localization marker is proximal to the autonomous vehicle.

7. The autonomous vehicle of claim 5, wherein the partially navigable portion of the vehicle transportation network is a parking area.

8. The autonomous vehicle of claim 5, wherein the processor is configured to execute instructions stored on the non-transitory computer readable medium to:
   detect the uncoded localization marker at an entrance to the partially navigable portion of the vehicle transportation network.

9. The autonomous vehicle of claim 5, wherein the partially navigable portion of the vehicle transportation network includes an entrance portion and an interior portion, and wherein the processor is configured to execute instructions stored on the non-transitory computer readable medium to:
   detect the uncoded localization marker in the interior portion.

10. The autonomous vehicle of claim 1, wherein the processor is configured to execute instructions stored on the non-transitory computer readable medium to:
    detect the uncoded localization marker on a road surface.

11. The autonomous vehicle of claim 1, wherein the processor is configured to execute instructions stored on the non-transitory computer readable medium to:
    detect the uncoded localization marker by detecting a two dimensional symbol.

12. An autonomous vehicle comprising:
    a processor configured to execute instructions stored on a non-transitory computer readable medium to:
       identify transportation network information representing a vehicle transportation network, the vehicle transportation network including a partially navigable portion, the partially navigable portion including a plurality of sparsely located uncoded localization markers, wherein each uncoded localization marker from the plurality of sparsely located uncoded localization markers is an instance of an invariant localization marker design, the transportation network information including localization marker information for each respective uncoded localization marker from the plurality of sparsely located uncoded localization markers, wherein the location information indicates a respective location of the respective uncoded localization marker in the vehicle transportation network,
- identify a route from an origin to a destination in the vehicle transportation network using the transportation network information, wherein the route includes at least a part of the partially navigable portion of the vehicle transportation network; and
- a trajectory controller configured to operate the autonomous vehicle to travel from the origin to the destination using the route, wherein the processor is configured to:
  - detect a first uncoded localization marker from the plurality of sparsely located uncoded localization markers in the vehicle transportation network,
  - generate first localization information indicating an orientation and a position of the autonomous vehicle relative to the first uncoded localization marker in response to detecting the first uncoded localization marker, and
  - generate second localization information indicating a current location of the autonomous vehicle in the vehicle transportation network based on the first localization information and localization marker information corresponding to the first uncoded localization marker, the localization marker information indicating a location of the uncoded localization marker in the vehicle transportation network, wherein the trajectory controller is configured to operate the autonomous vehicle to travel from the current location to the destination in response to generating the second localization information.

13. The autonomous vehicle of claim 12, further comprising:
- a sensor configured to detect the first uncoded localization marker on a condition that the first uncoded localization marker is within an area proximate to the autonomous vehicle, wherein the processor is configured to execute instructions stored on the non-transitory computer readable medium to detect the first uncoded localization marker by:
  - controlling the sensor to monitor the area proximate to the autonomous vehicle in response to determining that the autonomous vehicle is proximal to the partially navigable portion of the vehicle transportation network, and
  - receiving information from the sensor indicating the detected first uncoded localization marker.

14. The autonomous vehicle of claim 12, wherein the processor is configured to execute instructions stored on the non-transitory computer readable medium to:
- determine that the autonomous vehicle is proximal to the partially navigable portion of the vehicle transportation network on a condition that an accurate localization signal is unavailable, the transportation network information omits an accurate representation of a portion of the vehicle transportation network proximal to the autonomous vehicle, the transportation network information includes a partially navigable status indication for a portion of the vehicle transportation network proximal to the autonomous vehicle, or the transportation network information indicates that at least one of the plurality of sparsely located uncoded localization markers is proximal to the autonomous vehicle.

15. The autonomous vehicle of claim 12, wherein the partially navigable portion of the vehicle transportation network is a parking area.

16. The autonomous vehicle of claim 12, wherein the processor is configured to execute instructions stored on the non-transitory computer readable medium to:
- detect the first uncoded localization marker by detecting a two dimensional symbol on a road surface.

17. The autonomous vehicle of claim 12, wherein the processor is configured to execute instructions stored on the non-transitory computer readable medium to:
- determine the identified location of the autonomous vehicle in the vehicle transportation network by generating third localization information indicating an estimated location of the autonomous vehicle within the partially navigable portion of the vehicle transportation network using odometry; and
- determine the localization marker information by identifying the uncoded localization marker from the plurality of sparsely located uncoded localization markers based on the third localization information.

18. An autonomous vehicle comprising:
- a processor configured to execute instructions stored on a non-transitory computer readable medium to:
  - identify transportation network information representing a vehicle transportation network, the vehicle transportation network including a partially navigable portion, the partially navigable portion including a plurality of sparsely located uncoded localization markers, wherein each uncoded localization marker from the plurality of sparsely located uncoded localization markers is an instance of an invariant localization marker design, the transportation network information including localization marker information for each respective uncoded localization marker from the plurality of sparsely located uncoded localization markers, wherein the location information indicates a respective location of the respective uncoded localization marker in the vehicle transportation network,
  - identify a route from an origin to a destination in the vehicle transportation network using the transportation network information, wherein the route includes at least a part of the partially navigable portion of the vehicle transportation network; and
- a trajectory controller configured to operate the autonomous vehicle to travel from the origin to the destination using the route, wherein the processor is configured to:
  - generate first localization information indicating an estimated location of the autonomous vehicle within the partially navigable portion of the vehicle transportation network using odometry,
  - detect a first uncoded localization marker from the plurality of sparsely located uncoded localization markers,
  - generate second localization information indicating an orientation and a position of the autonomous vehicle relative to the first uncoded localization marker in response to detecting the first uncoded localization marker,
  - determine localization marker information corresponding to the first uncoded localization marker, wherein determining the localization marker information includes identifying the first uncoded localization marker from the plurality of sparsely located uncoded localization markers based on the first localization information, and
generate third localization information identifying a current location of the autonomous vehicle in the vehicle transportation network based on the second localization information and the localization marker information, wherein the trajectory controller is configured to operate the autonomous vehicle to travel from the current location to the destination in response to generating the third localization information.

19. The autonomous vehicle of claim 18, further comprising:
a sensor configured to detect the first uncoded localization marker on a condition that the first uncoded localization marker is within an area proximate to the autonomous vehicle, wherein the processor is configured to execute instructions stored on the non-transitory computer readable medium to:

determine that the autonomous vehicle is proximal to the partially navigable portion of the vehicle transportation network on a condition that an accurate localization signal is unavailable, the transportation network information omits an accurate representation of a portion of the vehicle transportation network proximal to the autonomous vehicle, the transportation network information includes a partially navigable status indication for a portion of the vehicle transportation network proximal to the autonomous vehicle, or the transportation network information indicates that the first uncoded localization marker is proximal to the autonomous vehicle; and
detect the first uncoded localization marker by:
controlling the sensor to monitor the area proximate to the autonomous vehicle in response to determining that the autonomous vehicle is proximal to the partially navigable portion of the vehicle transportation network, and
receiving information from the sensor indicating the detected first uncoded localization marker.

\* \* \* \* \*